(12) United States Patent
Smith et al.

(10) Patent No.: US 10,915,366 B2
(45) Date of Patent: Feb. 9, 2021

(54) SECURE EDGE-CLOUD FUNCTION AS A SERVICE

(71) Applicant: Intel Corporation, Santa Clara, CA (US)

(72) Inventors: Ned M. Smith, Beaverton, OR (US); Rajesh Poornachandran, Portland, OH (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 16/145,581

(22) Filed: Sep. 28, 2018

(65) Prior Publication Data
US 2019/0042315 A1 Feb. 7, 2019

(51) Int. Cl.
| | |
|---|---|
| *G06F 9/44* | (2018.01) |
| *G06F 9/50* | (2006.01) |
| *H04L 9/06* | (2006.01) |
| *G06F 16/182* | (2019.01) |
| *H04L 9/32* | (2006.01) |

(52) U.S. Cl.
CPC .......... *G06F 9/5038* (2013.01); *G06F 9/5027* (2013.01); *G06F 9/5072* (2013.01); *G06F 9/5077* (2013.01); *G06F 16/1837* (2019.01); *H04L 9/0637* (2013.01); *H04L 9/3239* (2013.01); *H04L 2209/38* (2013.01)

(58) Field of Classification Search
CPC ....................................................... G06F 9/44
See application file for complete search history.

(56) References Cited

U.S. PATENT DOCUMENTS

| | | | |
|---|---|---|---|
| 7,353,295 B1* | 4/2008 | Crow | H04L 67/16 370/359 |
| 2017/0220815 A1* | 8/2017 | Ansari | G06Q 20/389 |
| 2017/0310565 A1* | 10/2017 | Nedeltchev | H04L 41/14 |
| 2018/0115538 A1* | 4/2018 | Blake | H04L 9/14 |
| 2019/0028552 A1* | 1/2019 | Johnson, II | H04L 67/16 |
| 2019/0182254 A1* | 6/2019 | Christidis | H04L 9/0637 |

OTHER PUBLICATIONS

Stanciu ("Blockchain based distributed control system for Edge Computing"), 2017 (Year: 2017).*
Stanciu ("Blockchain based distributed control system for Edge Computing") (Year: 2017).*
"European Application Serial No. 19183074.4, Extended European Search Report dated Dec. 13, 2019", 9 pgs.
Alexandru, Stanciu, "Blockchain Based Distributed Control System for Edge Computing", 21st International Conference on Control Systems and Computer Science (CSCS), (May 29, 2017), XP055546757, (May 29, 2017), 667-671.

(Continued)

*Primary Examiner* — Jae U Jeon
(74) *Attorney, Agent, or Firm* — Schwegman Lundberg & Woessner, P.A.

(57) ABSTRACT

System and techniques for secure edge-cloud function-as-a-service (FaaS) are described herein. A FaaS node may receive a request to execute a function. The FaaS node executes the function and enters a result of the function execution into a blockchain. Here, the blockchain is accessible to a plurality of FaaS architectural nodes.

24 Claims, 9 Drawing Sheets

(56) References Cited

OTHER PUBLICATIONS

Ashkan, Yousefpour, "All One Needs to Know about Fog Computing and Related Edge Computing Paradigms: A Complete Survey", arxiv.org, Cornell University Library, 201 Olin Library Cornell University Ithaca, NY 14853, (Aug. 15, 2018), XP081257480, (Aug. 15, 2018), 1-31.

Jianbing, Ni, "Securing Fog Computing for Internet of Things Applications: Challenges and Solutions", IEEE Communications Surveys and Tutorials, vol. 20, No. 1, (Feb. 23, 2018), XP011678441, (Feb. 23, 2018), 601-628.

\* cited by examiner

SECURE EDGE-CLOUD FUNCTION AS A SERVICE

TECHNICAL FIELD

Embodiments described herein generally relate to networked computer architectures and more specifically to secure edge-cloud function as a service (FaaS).

BACKGROUND

FaaS—also known as a serverless service—is an emerging technology to support the next wave of compute services along with mobile edge computing (MEC) (e.g., as defined by the 3GPP 5G family of standards). FaaS usually involves a remote procedure calling (RPC) facility (e.g., via representational state transfer (REST)) used to invoke a single function (e.g., procedure, method, etc.) by a device. The architecture attempts to simplify the developer experience by minimizing the operational overhead in deploying and managing applications and the components of those application. Different FaaS implementations may use different virtualization techniques, such as container or virtual machine (VM) host functions. In some cases these implementations may be referred to as a Virtual network function or VNF or network functions virtualization (NFV).

Using FaaS, applications are generally split into many much smaller workloads than previous generations of application. This added flexibility enables portions of the application to be migrated to the edge, resulting in lower latencies and reduce stress on backhaul networks. To further ease developer burdens, edge technologies, such as 3GPP 5G, may mimic cloud interfaces, transparently exposing compatible sets of services close to internet of things (IoT) device applications.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Although FaaS architectures provide options for developers, they are often accompanied by issues related to the increased complexity. For example, synchronization of functional state of applications between edge and cloud for compatible set of services may be a challenge. Further, secure metering of FaaS execution across edge and cloud at runtime may be challenging because there generally is not enough control for monitoring FaaS invocations—e.g., how often are the functions run, how long they operate, reasons for performance impacts, etc.—because developers do not generally control distributed FaaS execution platforms. This last issue may be particularly relevant to the widespread use of FaaS in order to establish trust between FaaS operators and the underlying FaaS support hardware and services.

Attempts to solve the synchronization and task-completion metrics (e.g., metering) are generally ad hoc, lacking efficient synchronization of application functional state edge and cloud for compatible sets of services, and missing secure metering of FaaS execution across edge and cloud at runtime. Often, this is true because there is not enough control exposed at the compute nodes for monitoring FaaS invocations.

To address some of the issues noted above, compatible homogenous or heterogeneous FaaS containers between edge and cloud may be registered with provisioned credentials. An edge FaaS container may trigger a queue event to cloud FaaS upon handling a trigger for a FaaS call. The queue event (e.g., message) may thereby synchronize the functional state of edge and cloud FaaS containers for compatible functions. In an example, the edge and cloud FaaS containers may perform secure time synchronization using respective platform trusted execution environments (TEE) or the like, such as a trusted platform module (TPM), hardware security module (HSM), etc. In this example, credentials may be provisioned in a challenge-response protocol.

Secure metering of FaaS execution across edge and cloud at runtime may be implemented using platform TEE along with FaaS node monitoring capabilities on FaaS invocations. Manageability policies may be configured at the edge or cloud using TEE out-of-band access. In an example, secure metering may itself be exposed as a FaaS service.

In an example, FaaS synchronization with secure metering may be deployed over a light-weight blockchain. Here, peer FaaS nodes may contribute to verifying the FaaS telemetry information based on distributed consensus techniques or the like. Using blockchain in this manner, hierarchical FaaS—e.g., from access point (AP) edge, to central office edge, to core, and to cloud—may be efficiently synchronized with auditable records of FaaS requests and FaaS node performance of those requests.

Figure 1:
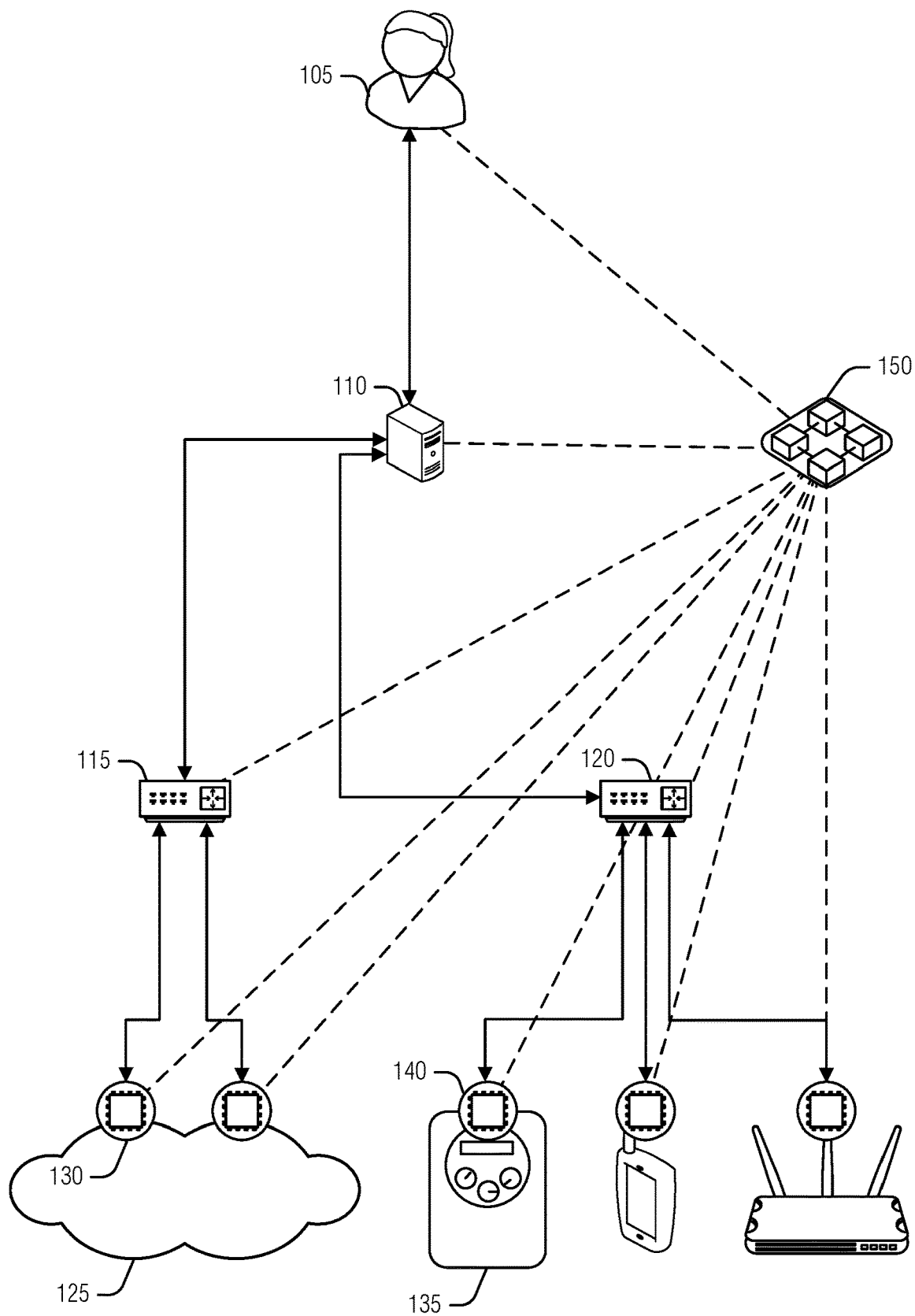
FIG. 1 is a block diagram of an example of an environment including a system for secure edge-cloud FaaS, according to an embodiment.

FIG. 1 is a block diagram of an example of an environment including a system for secure edge-cloud FaaS, according to an embodiment. As illustrated, the environment includes a client 105, an orchestrator 110, function decomposition engines (FDEs)—cloud FDE 115 (CFDE) and edge FDE 120 (EFDE)—cloud FaaS node 130 in a cloud 125, edge FaaS node 140 at an edge device 135, and a distributed blockchain 150 that is accessible to the FaaS architectural nodes (e.g., the client 105, the orchestrator 110, the CFDE 115, the EFDE 120, the cloud FaaS node 130, and the edge FaaS node 140).

Generally, the orchestrator 110 provides facilities to connect the client 105 to the FaaS nodes 130 or 140. These facilities may include published functions provided by the FaaS nodes 130 or 140 (e.g., FaaS processor), service level agreements (SLAs), costs, availability, etc. The orchestrator 110 may receive updates from the FaaS nodes 130 or 140, may query these nodes, receive the information to publish from an administrator interface, or combinations of these sources and more. In an example, the orchestrator 110 may operate as a gateway, or bridge, between the client 105 and a wires or wireless network (e.g., the cloud 125) upon which the FaaS nodes 130 or 140 reside.

Upon receiving a workload from the client 105, the orchestrator 110 is arranged to create an execution plan. The execution plan organizes which FaaS nodes (e.g., by functionality, availability, resource constraints or balancing, etc.) to use to complete the client workload. Thus, the orchestrator 110 is arranged to receive a client request to perform a task. The orchestrator 110 may then organize a plurality of FaaS nodes 130 or 140 to perform the task. The orchestrator 110 may then transmit requests to the plurality of FaaS nodes 130 or 140 to complete portions of the task. In an example, the plurality of FaaS nodes 130, 140 use the blockchain 150 to coordinate completion of portions of the task. Here, the blockchain ledger entries may be used to track progress of the task. The orchestrator 110 may include the execution plan along with which FaaS node 130, 140 is to complete each portion. The FaaS node 130, 140, upon completion, then creates a transaction, indicating a state change of the orchestrator's original transaction from incomplete to complete. In this way, the complete state of the execution plan may be reconstructed and used by any FaaS architectural node.

Although not necessary, the orchestrator 110 may employ FDEs 115 or 120 to help with the execute plan. The FDEs 115 and 120 decompose the workload, or a portion thereof, into sub-tasks that may correspond directly to FaaS node functions. The FDEs 115 and 120 operate as a delegate (e.g., sub-contractor to the orchestrator's general contractor) with enhanced knowledge of its domain and the resident FaaS nodes. This may enable a faster and more efficient execution of the client workload. Thus, in an example, when organizing the plurality of FaaS nodes 130, 140 to perform the task, the orchestrator 110 is arranged to transmit the task to an FDE 115 or 120. The FDE 115 or 120 is arranged to split the task into subtasks that correlate with available FaaS node capabilities. In an example, the result of the function is transmitted to the FDE 115 or 120. In this manner, the FDE 115 or 120 may aggregate results, or coordinate data consolidation, to remove this burden from the orchestrator 110. In network constrained situations, such an arrangement may enable more efficient network utilization.

As noted above, the FaaS nodes 130 and 140 provide individual function or sub-task execution for the client workload. For convenience, edge FaaS node 140 is used in the examples below, although many of the details are equally applicable to cloud FaaS node 130 unless otherwise indicated. FaaS node 140 implements a function as a service architecture, including an execution and return interface. Thus, via this interface, the FaaS node 140 may receive a request to execute a function. In an example, the request identifies a target (e.g., requestor, next node in the execution plan, third-party, etc.) to which results of the function execution should be sent. In an example, the request includes SLA requirements, such as security procedures (e.g., encrypted memory, encrypted storage, etc.), geographic restrictions (e.g., certain data must be maintained within a country, or not exported to another country, etc.), or other contextual elements that may change the behavior of the FaaS node 140.

The FaaS node 140 is arranged to execute its function given the parameters contained in the received request. In an example, the function is executed in a container. The container provides some level of abstraction between the physical hardware of the FaaS node and hardware accessible to software executing on the FaaS node 140. This abstraction enables greater flexibility to isolate workloads or multiplex tasks on the FaaS node 140. In an example, the container employs memory encryption for the function execution. Here, each workload is encrypted with a key. In an example, the key is unique to each client 105 or tenant. In an example, the container synchronizes state among different FaaS nodes operating on a user request that resulted in the request. State synchronization may be handled via the blockchain 150 as described above, via asynchronous communications (e.g., message queues and the like), or via other distributed computing models.

The FaaS node 140 is arranged to enter a result of the function execution into the blockchain 150. In an example, the result entry includes one or more metrics of the function execution. In an example, the metrics are stored in a secure facility of the FaaS node 140 while they are being collected. The metrics are then provided from the secure facility to the blockchain 150 in the form of a transaction. Here, the transaction includes the result as part of an updated state to a state already recorded in the blockchain 150 (e.g., from the orchestrator 110 or an FDE 120).

Employing the blockchain 150 as described herein provides an end-to-end audit of FaaS node 140 activity in an execution plan. This enables trust between the client 105 and the possible disparately controlled FaaS architectural nodes. Such trust may lead to further edge FaaS node 140 deployments, increasing network efficiency and computational performance—by locating computing resources near the client 105—over what is achievable today.

Figure 2:
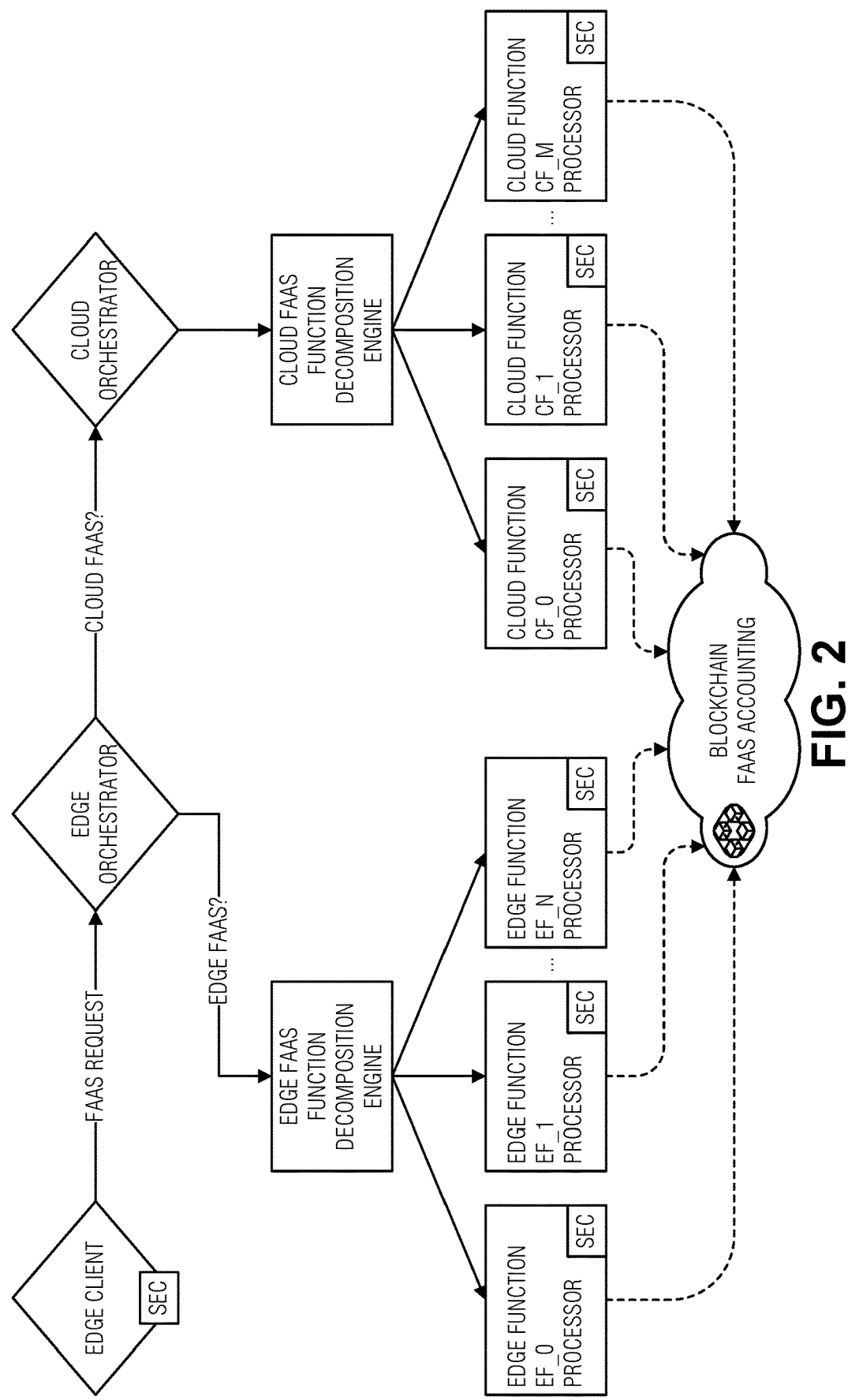
FIG. 2 illustrates an example of a system model for secure edge-cloud FaaS, according to an embodiment.

FIG. 2 illustrates an example of a system model for secure edge-cloud FaaS, according to an embodiment. Here, an edge client node—such as a mobile application, browser, gateway, IoT device, edge server, etc.—has one or more functions that may be executed using FaaS infrastructure. As illustrated the "SEC" block indicates intrinsic hardware security (such as a TEE) on the devices.

An edge orchestration node (e.g., edge orchestrator) receives the FaaS request that includes one or more FaaS functions (e.g., EF0, EF1, . . . , EFn, CF0, CF1, . . . , Cm). The functions may be implemented using either or both edge FaaS and cloud FaaS processors. The edge orchestrator determines how to route the client request, possibly dividing it into multiple requests some of which are sent to an edge function decomposition engine (EFDE), and some of which are sent to a cloud function decomposition engine (CFDE). The CFDE may be discovered and routed through a cloud orchestrator node in cases where the infrastructures between edge and cloud do not fully support end-to-end FaaS routing, scheduling, or transaction metering. The EFDE and CFDE may receive a FaaS request that includes a plan as to which edge function processors are to be used and in which order. In an example, the plan is a FaaS execution plan specific to the EFDE or CFDE respectively. The orchestrators play a role in ensuring the full FaaS execution plan is satisfied.

The FaaS function processors isolate execution of different workloads when executing the function to ensure security between different tenant workloads. In an example, the FaaS function processors may employ light-weight container techniques—such as application-level partitioning, operating system (OS) level partitioning (e.g., sandboxing), virtual machine (VM) level partition, hardware facilitated separation (e.g., TEE, or the like)—to isolate executions of the function. In an example, the FaaS function processor may further protect workload data by applying a multi-key total-memory encryption (MKTME) of memory pages assigned to different tenant workloads (e.g., each execution thread). Here, a different MKTME key is used for each tenant of the FaaS function processor. In an example, the MKTME keys are stored in a key storage service in the FaaS function processor, here illustrated as "SEC" blocks, which may be TPM, HSM, where each environment is arranged to provide a root-of-trust key to each tenant.

In an example, the FaaS function processors each track the time applied to a tenant-specific workload, for example, based on a tick-counter maintained in the TEE. In an example, the FaaS function processors log each execution event using a public or private blockchain that is common to all FaaS function processors and the FaaS client. Here, the blockchain maintains a ledger tracking several pieces of information—such as the tenant request, which function was invoked, resources (e.g., processor, memory, storage, network, etc.) applied to function execution, sequence of function execution, etc. The FaaS client, orchestrators, or other stakeholders (e.g., FaaS architectural nodes) may access the blockchain to re-construct a historical record of FaaS activity.

Figure 3:
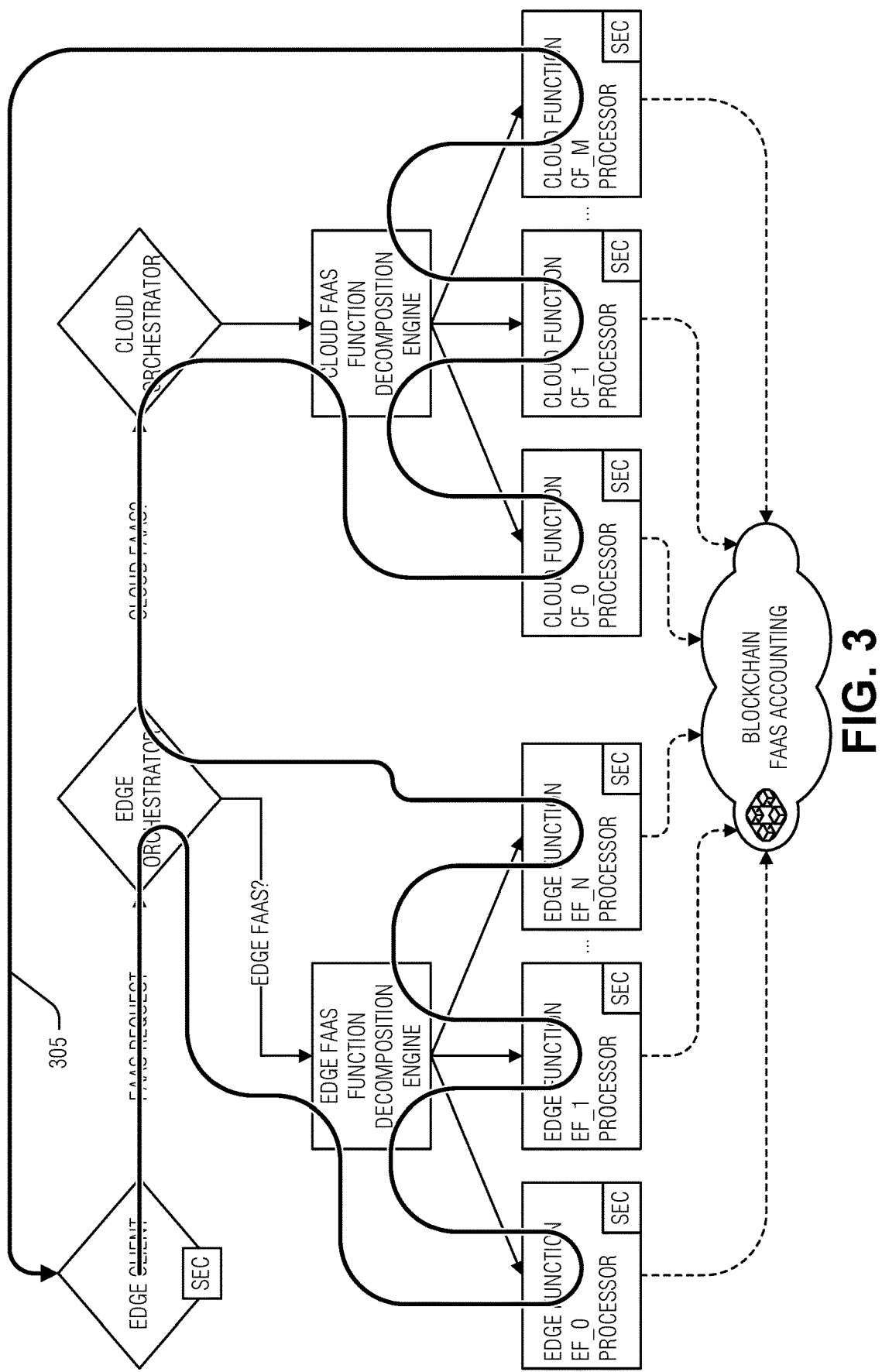
FIG. 3 illustrates an example of an execution plan for secure edge-cloud FaaS, according to an embodiment.

FIG. 3 illustrates an example of an execution plan for secure edge-cloud FaaS, according to an embodiment. The device organization of FIG. 2 is here reproduced with an execution plan path 305, illustrating the route by which the FaaS client makes a request and the request is processed. Thus, the edge client supplies a FaaS workload to its assigned orchestrator. The orchestrator segments the workload according to functions available via edge and or cloud decomposition engines. In an example, there may be multiple layers of orchestrators that perform gateway functionality enabling discovery of decomposition engines within networks. Function decomposition engines may maintain discovery or performance statistics regarding the various local FaaS function processors it is capable of scheduling. The statistics may include network latency, average function execution latency, resources consumption (e.g., memory, processor, energy, network bandwidth, etc.). The function decomposition engines may also maintain context information for FaaS function processors, such as geographic location (e.g., which may be used for geofence execution policy support) among others. The orchestrators, function decomposition engines, and FaaS function processors cooperate to execute the FaaS execution plan 305. Thus, the orchestrator, EFDE, CFDE or FaaS node (e.g., edge function processor (EFP)) may perform multiple roles such that an FaaS node may further orchestrate or decompose FaaS workloads in a cascaded or hierarchical approach as needed or determined by the execution plan 305. In an example, a current position in the execution plan 305 is tracked via the blockchain, each function being committed (e.g., entered as a transaction in the blockchain) when it is complete and requisite execution details—such as tenant, clock ticks, cost of operation, etc.— are included in the transaction. In an example, tenant identity or execution details may be concealed (e.g. encrypted to a logging node using the logging node's public key or shared symmetric key) to protect tenant privacy. In an example, the blockchain transactions are integrity protected using private transaction logging keys of the FaaS function processors to sign each transaction.

In an example, the FaaS node creates a transaction that includes execution details. The transaction may then be signed by the FaaS node and transmitted to a FaaS logging node. In an example, A micro-payment in an e-cash or e-coin may also be included to remunerate the logging node. The blockchain nodes accept the transaction according to a distributed consensus algorithm (e.g. as used in a variety of blockchain based systems, such as Ethereum, Dfinity, or Bitcoin). In a private blockchain deployment, a token e-currency value may be exchanged to disambiguate a transaction but payment for logging services is out-of-band (e.g., outside the scope of the blockchain system).

Figure 4:
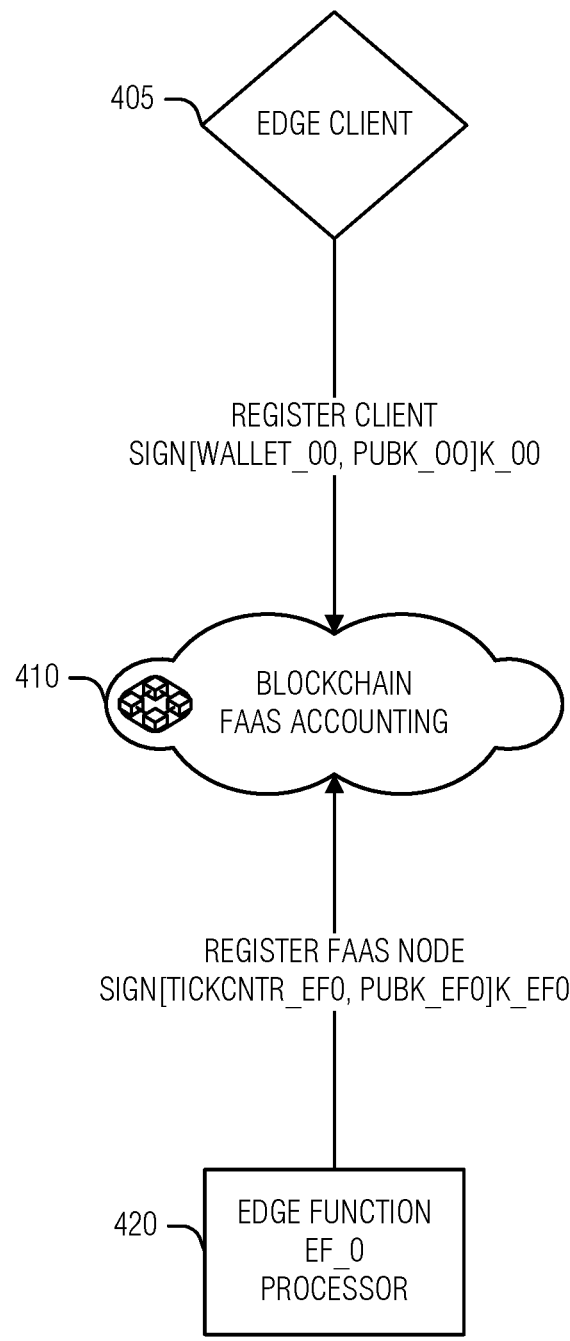
FIG. 4 illustrates an example of blockchain registration, according to an embodiment.

FIG. 4 illustrates an example of blockchain registration, according to an embodiment. Registration with the blockchain 410 enables FaaS function processors 420 to be available to clients 405, orchestrators, and FDEs. Client registration establishes a tenant identity suitable for public or semi-public tracking of a FaaS execution plan, enabling the FaaS execution plan to be attributed to an appropriate tenant. In an example, the client 405 may register a wallet identity. Here, payment for the FaaS service may be transacted upon condition of both partial and full execution of the FaaS workload. FaaS function processor registration may establish an initial value of a tick counter used for metering function workloads. The blockchain 410 ensures that tick counter values are well behaved (e.g. are monotonically increasing and are statistically aligned with other executions of the same function). The edge and cloud based orchestration illustrated above may be easily scaled to a 5G everything-to-everything (E2E) environment that includes FaaS nodes 420 across AP, local central office, regional central, core, and the cloud. In an example, FDEs in a hierarchical organization may perform smart-caching based on past history of FaaS executions. This enables dynamic orchestration of FDEs to efficiently scale up and out across the various FaaS nodes.

Figure 5:
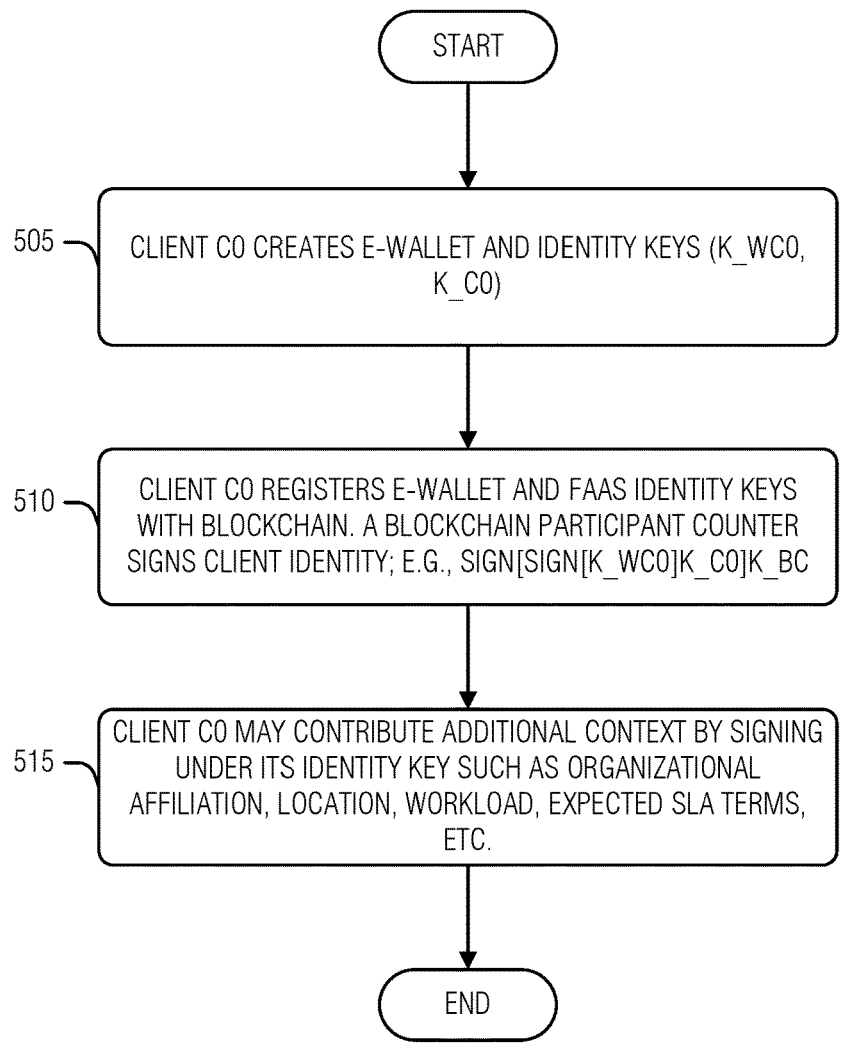
FIG. 5 illustrates a flow diagram of an example of a method for client registration, according to an embodiment.

FIG. 5 illustrates a flow diagram of an example of a method 500 for client registration, according to an embodiment. The operations of the method 500 are performed by computer hardware. The client registration begins when the client (C0) creates an identity key (K_C0) and an e-wallet key (K_WC0) (operation 505). These keys may then be registered with a FaaS common blockchain (operation 510). As part of the registration process with the blockchain, the blockchain may sign the client's identity. As illustrated, the client identity is used to sign the client e-wallet key, the result of which is signed by the blockchain key (K_BC).

The client may contribute addition information, such as organizational affiliation, geographical location, logical location (e.g., in which network), expected service level agreement (SLA) terms, its current workload, etc., to the blockchain (operation 515). Here, the client may sign this information with its own identity key (K_C0).

Figure 6:
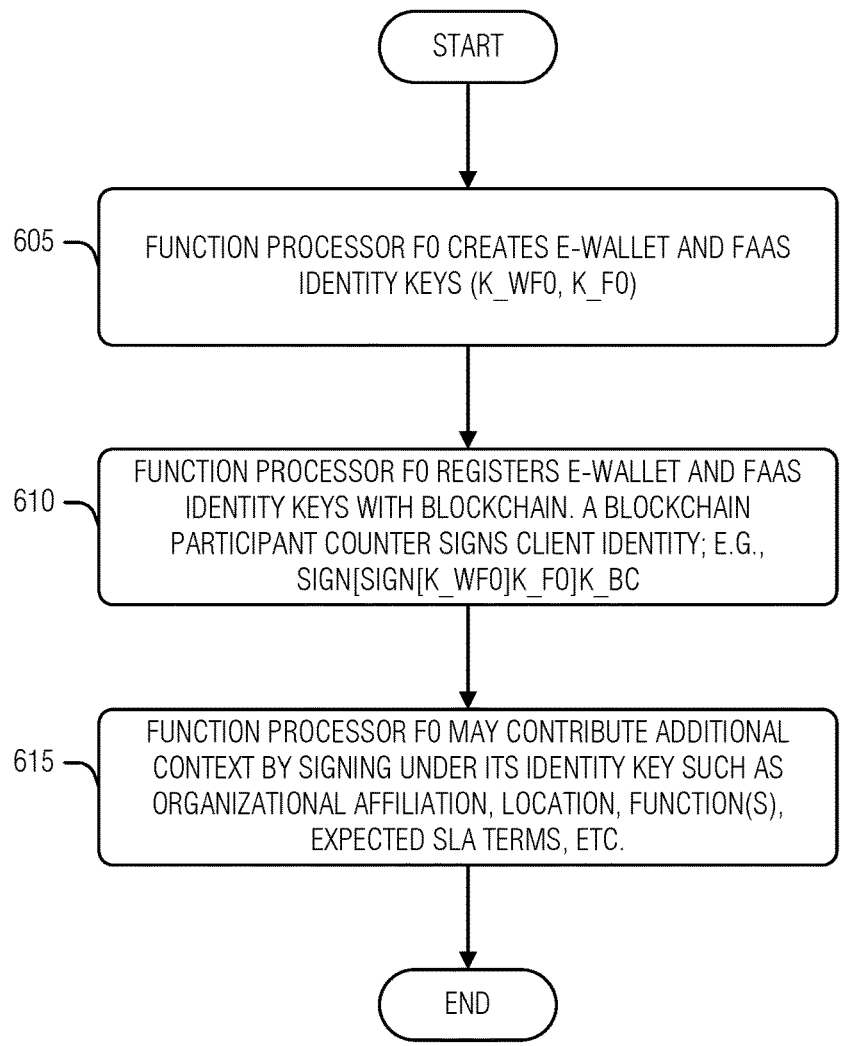
FIG. 6 illustrates a flow diagram of an example of a method for FaaS processor registration, according to an embodiment.

FIG. 6 illustrates a flow diagram of an example of a method 600 for FaaS processor registration, according to an embodiment. The operations of the method 600 are performed by computer hardware. Much like the client registration described above, the FaaS processor registration begins when the FaaS processor (F0) creates an identity key (K_F0) and an e-wallet key (K_WF0) (operation 605). These keys may then be registered with a FaaS common blockchain (operation 610). As part of the registration process with the blockchain, the blockchain may sign the FaaS processor's identity. As illustrated, the FaaS processor identity is used to sign the FaaS processor e-wallet key, the result of which is signed by the blockchain key (K_BC).

The FaaS processor may contribute addition information, such as organizational affiliation, geographical location, logical location (e.g., in which network), actual service level agreement (SLA) terms, its current workload, etc., to the blockchain (operation 615). Here, the client may sign this information with its own identity key (K_F0).

Verifiable auditing across different devices is a benefit from the blockchain procedures illustrated in FIGS. 5 and 6. Thus, an independent auditor may inspect SLA terms to detect a disparity between expected and actual SLA terms. This disparity may inform dispute resolution procedures or to negotiate different SLA terms for a future transaction.

Figure 7:
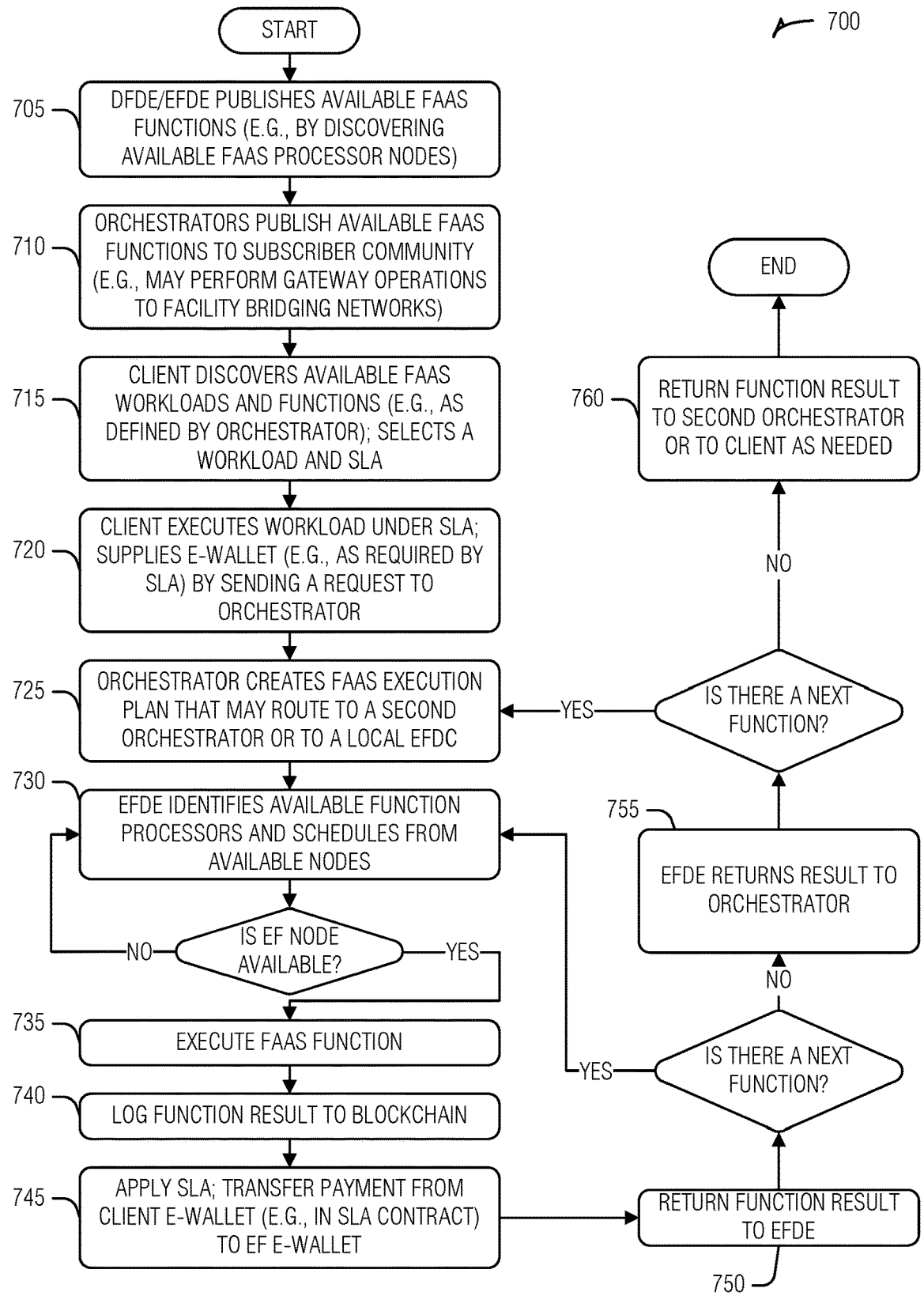
FIG. 7 illustrates a flow diagram of an example of a method for FaaS execution flow, according to an embodiment.

FIG. 7 illustrates a flow diagram of an example of a method 700 for FaaS execution flow, according to an embodiment. The operations of the method 700 are performed by computer hardware. FDEs (e.g., CFDEs or EFDEs) publish available FaaS functions supported by the available FaaS nodes. (operation 705). These orchestrators make the published FaaS functions available to the subscriber community (e.g., client nodes), and may also perform gateway or bridging services for these communities. (operation 710).

A client discovers available FaaS functionality (operation 715) and contacts the orchestrator to execute a workload (operation 720). The orchestrator creates a FaaS execution plan (operation 725) and then marshals FaaS nodes to execute the plan (operation 730). If a node is not available, the marshaling is continued (operation 730); else, the FaaS nodes execute the assigned functions from the plan (operation 735). The results of the executions are logged to the blockchain (operation 740) and, is applicable, the performance is gauged against the SLA and payment is addressed (operation 745).

After a given FaaS node completes execution of a workload, the result is returned to the orchestrator (operation 750). If there are more functions to execute in the plane, the method 700 revisits operation 730 until there are no more functions left to execute in the plan. At this point, the orchestrator returns the workload result to the client (operation 755). If additional client workloads have been requested, the method 700 revisits operation 725 until they are complete. Then, the completed results are communicated to the client, or other orchestrators, as needed (operation 760).

Figure 8:
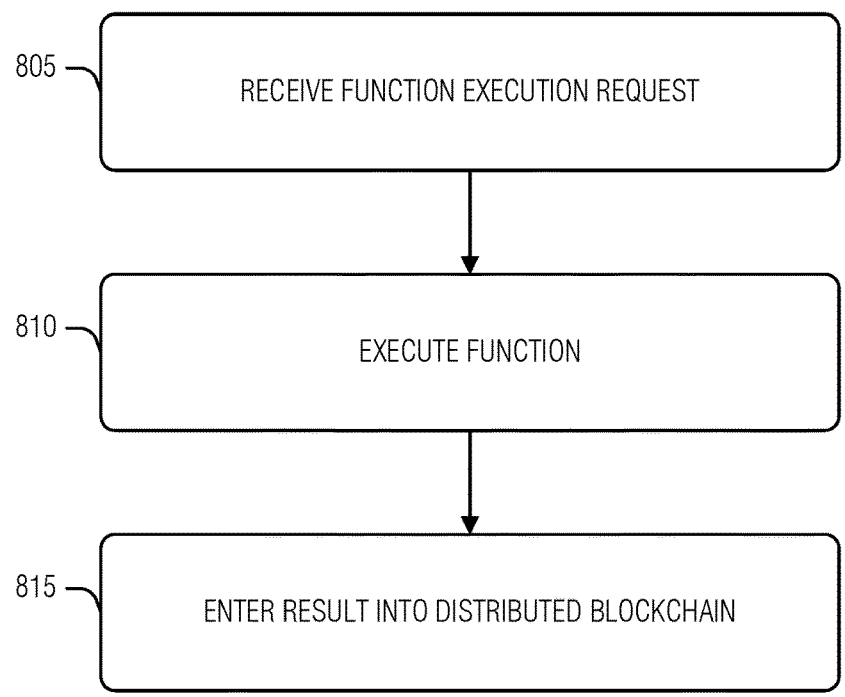
FIG. 8 illustrates a flow diagram of an example of a method for secure edge-cloud FaaS, according to an embodiment.

FIG. 8 illustrates a flow diagram of an example of a method 800 for secure edge-cloud FaaS, according to an embodiment. The operations of the method 800 are performed by computer hardware.

At operation 805, a FaaS node receives a request to execute a function. In an example, the FaaS node is at least one of an edge node or a cloud node.

At operation 810, the function is executed. In an example, executing the function includes executing the function in a container on the FaaS node. In an example, the container employs memory encryption for the function execution. In an example, the container synchronizes state among different FaaS nodes operating on a user request that resulted in the request.

At operation 815, a result of the function execution is entered into a blockchain. Here, the blockchain is accessible to a plurality of FaaS architectural nodes. In an example, entering the result of the function includes storing metrics of function execution in a secure facility of the FaaS node. The metrics are then provided from the secure facility to the blockchain in the form of a transaction. In an example, entering the result of the function execution into the blockchain includes entering a transaction into the blockchain. Here, the transaction includes the result as part of an updated state to a state already recorded in the blockchain. In an example, the state already recorded in the blockchain was entered by an orchestrator servicing the request. In an example, the already entered state includes an intended action for the FaaS node.

In an example, the method 800 is extended to include transmitting the result of the function to a target. In an example, the target provided the request. In an example, the target is specified in the request.

In an example, the method 800 is extended to include receiving a user request to perform a task at a FaaS orchestrator. The FaaS orchestrator may then organize a plurality of FaaS nodes to perform the task. Here, the FaaS node is one of the nodes in the plurality of FaaS nodes. The orchestrator may then transmit requests to the plurality of FaaS nodes to complete portions of the task. In an example, the plurality of FaaS nodes use the blockchain to coordinate completion of portions of the task.

In an example, organizing the plurality of FaaS nodes to perform the task includes transmitting the task to a function decomposition engine (FDE) to split the task into subtasks that correlate with available FaaS node capabilities. In an example, the FDE is at least one of an edge FDE (EFDE) or cloud FDE (CFDE). In an example, the result of the function is transmitted to the FDE.

In an example, orchestrator nodes are also connected to a blockchain FaaS accounting system where event scheduling may also be logged and where edge client or other orchestrators may remunerate a first orchestrator for delivery of orchestration services upon completion of or in anticipation of an orchestration event.

Figure 9:
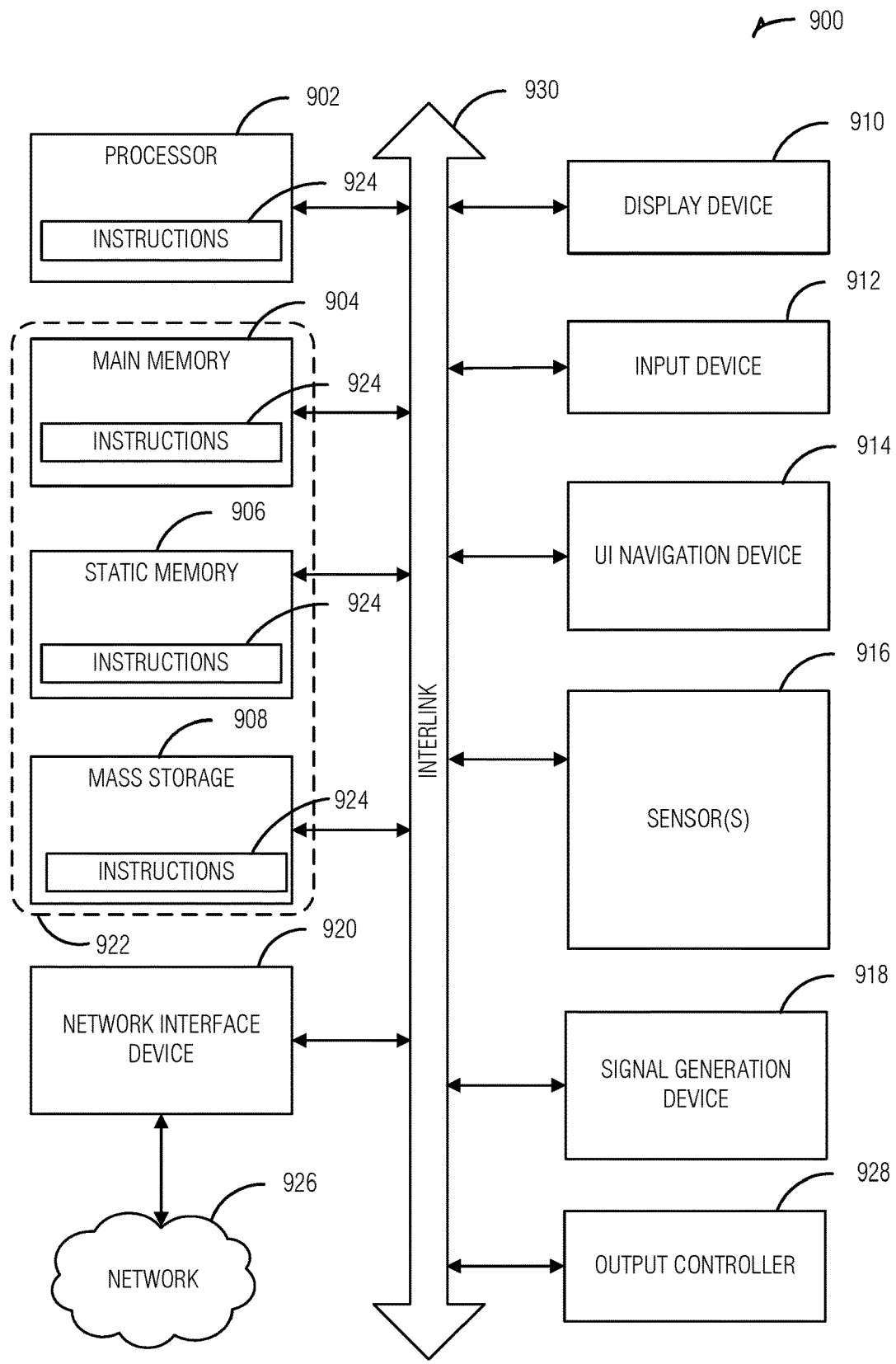
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. Examples, as described herein, may include, or may operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., wired or wirelessly networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

ADDITIONAL NOTES & EXAMPLES

Example 1 is a system for secure edge-cloud function as a service (FaaS), the system comprising: a FaaS node that includes: a memory including instructions; and processing circuitry that, when in operation, is configured by the instructions to: receive a request to execute a function; execute the function; and enter a result of the function execution into a blockchain, the blockchain being accessible to a plurality of FaaS architectural nodes.

In Example 2, the subject matter of Example 1, wherein the instructions configure the processing circuitry to transmit the result of the function to a target.

In Example 3, the subject matter of Example 2, wherein the target provided the request.

In Example 4, the subject matter of any of Examples 2-3, wherein the target is specified in the request.

In Example 5, the subject matter of any of Examples 1-4, wherein the FaaS node is at least one of an edge node or a cloud node.

In Example 6, the subject matter of any of Examples 1-5, wherein, to enter the result of the function, the processing circuitry is arranged by the instructions to: store metrics of function execution in a secure facility of the FaaS node; and provide the metrics of function execution from the secure facility to the blockchain in the form of a transaction.

In Example 7, the subject matter of any of Examples 1-6, comprising: a FaaS orchestrator that includes: a second memory including second instructions; and second processing circuitry that, when in operation, is configured by the second instructions to: receive a user request to perform a task; organize a plurality of FaaS nodes to perform the task, the plurality of FaaS nodes including the FaaS node; and transmit requests to the plurality of FaaS nodes to complete portions of the task, the requests including the request to the FaaS node.

In Example 8, the subject matter of Example 7, wherein, to organize the plurality of FaaS nodes to perform the task, the second instructions configure the second processing circuitry to transmit the task to a function decomposition engine (FDE) to split the task into subtasks that correlate with available FaaS node capabilities.

In Example 9, the subject matter of Example 8, wherein the FDE is at least one of an edge FDE (EFDE) or cloud FDE (CFDE).

In Example 10, the subject matter of any of Examples 8-9, wherein the result of the function is transmitted to the FDE.

In Example 11, the subject matter of any of Examples 7-10, wherein the plurality of FaaS nodes use the blockchain to coordinate completion of portions of the task.

In Example 12, the subject matter of any of Examples 1-11, wherein, to execute the function, the instructions configure the processing circuitry to execute the function in a container on the FaaS node.

In Example 13, the subject matter of Example 12, wherein the container employs memory encryption for the function execution.

In Example 14, the subject matter of any of Examples 12-13, wherein the container synchronizes state among different FaaS nodes operating on a user request that resulted in the request.

In Example 15, the subject matter of any of Examples 1-14, wherein, to enter the result of the function execution into the blockchain, the instructions configure the processing circuitry to enter a transaction into the blockchain, the transaction including the result as part of an updated state to a state already recorded in the blockchain.

In Example 16, the subject matter of Example 15, wherein the state already recorded in the blockchain was entered by an orchestrator servicing the request.

In Example 17, the subject matter of Example 16, wherein the already entered state includes an intended action for the FaaS node.

Example 18 is a method for secure edge-cloud function as a service (FaaS), the method comprising: receiving, by a FaaS node, a request to execute a function; executing the function; and entering a result of the function execution into a blockchain, the blockchain being accessible to a plurality of FaaS architectural nodes.

In Example 19, the subject matter of Example 18, comprising transmitting the result of the function to a target.

In Example 20, the subject matter of Example 19, wherein the target provided the request.

In Example 21, the subject matter of any of Examples 19-20, wherein the target is specified in the request.

In Example 22, the subject matter of any of Examples 18-21, wherein the FaaS node is at least one of an edge node or a cloud node.

In Example 23, the subject matter of any of Examples 18-22, wherein entering the result of the function includes: storing metrics of function execution in a secure facility of the FaaS node; and providing the metrics of function execution from the secure facility to the blockchain in the form of a transaction.

In Example 24, the subject matter of any of Examples 18-23, comprising: receiving a user request to perform a task at a FaaS orchestrator; organizing, by the FaaS orchestrator, a plurality of FaaS nodes to perform the task, the plurality of FaaS nodes including the FaaS node; and transmitting requests to the plurality of FaaS nodes to complete portions of the task, the requests including the request to the FaaS node.

In Example 25, the subject matter of Example 24, wherein organizing the plurality of FaaS nodes to perform the task includes transmitting the task to a function decomposition engine (FDE) to split the task into subtasks that correlate with available FaaS node capabilities.

In Example 26, the subject matter of Example 25, wherein the FDE is at least one of an edge FDE (EFDE) or cloud FDE (CFDE).

In Example 27, the subject matter of any of Examples 25-26, wherein the result of the function is transmitted to the FDE.

In Example 28, the subject matter of any of Examples 24-27, wherein the plurality of FaaS nodes use the blockchain to coordinate completion of portions of the task.

In Example 29, the subject matter of any of Examples 18-28, wherein executing the function includes executing the function in a container on the FaaS node.

In Example 30, the subject matter of Example 29, wherein the container employs memory encryption for the function execution.

In Example 31, the subject matter of any of Examples 29-30, wherein the container synchronizes state among different FaaS nodes operating on a user request that resulted in the request.

In Example 32, the subject matter of any of Examples 18-31, wherein entering the result of the function execution into the blockchain includes entering a transaction into the blockchain, the transaction including the result as part of an updated state to a state already recorded in the blockchain.

In Example 33, the subject matter of Example 32, wherein the state already recorded in the blockchain was entered by an orchestrator servicing the request.

In Example 34, the subject matter of Example 33, wherein the already entered state includes an intended action for the FaaS node.

Example 35 is at least one machine readable medium including instructions for secure edge-cloud function as a service (FaaS), the instructions, when execute by processing circuitry of a FaaS node, cause the processing circuitry to perform operations comprising: receiving a request to execute a function; executing the function; and entering a result of the function execution into a blockchain, the blockchain being accessible to a plurality of FaaS architectural nodes.

In Example 36, the subject matter of Example 35, wherein the operations comprise transmitting the result of the function to a target.

In Example 37, the subject matter of Example 36, wherein the target provided the request.

In Example 38, the subject matter of any of Examples 36-37, wherein the target is specified in the request.

In Example 39, the subject matter of any of Examples 35-38, wherein the FaaS node is at least one of an edge node or a cloud node.

In Example 40, the subject matter of any of Examples 35-39, wherein entering the result of the function includes: storing metrics of function execution in a secure facility of the FaaS node; and providing the metrics of function execution from the secure facility to the blockchain in the form of a transaction.

In Example 41, the subject matter of any of Examples 35-40, comprising second instructions that, when execute by second circuitry a FaaS orchestrator, cause the second circuitry to perform second operations comprising: receiving a user request to perform a task; organizing a plurality of FaaS nodes to perform the task, the plurality of FaaS nodes including the FaaS node; and transmitting requests to the plurality of FaaS nodes to complete portions of the task, the requests including the request to the FaaS node.

In Example 42, the subject matter of Example 41, wherein organizing the plurality of FaaS nodes to perform the task includes transmitting the task to a function decomposition engine (FDE) to split the task into subtasks that correlate with available FaaS node capabilities.

In Example 43, the subject matter of Example 42, wherein the FDE is at least one of an edge FDE (EFDE) or cloud FDE (CFDE).

In Example 44, the subject matter of any of Examples 42-43, wherein the result of the function is transmitted to the FDE.

In Example 45, the subject matter of any of Examples 41-44, wherein the plurality of FaaS nodes use the blockchain to coordinate completion of portions of the task.

In Example 46, the subject matter of any of Examples 35-45, wherein executing the function includes executing the function in a container on the FaaS node.

In Example 47, the subject matter of Example 46, wherein the container employs memory encryption for the function execution.

In Example 48, the subject matter of any of Examples 46-47, wherein the container synchronizes state among different FaaS nodes operating on a user request that resulted in the request.

In Example 49, the subject matter of any of Examples 35-48, wherein entering the result of the function execution into the blockchain includes entering a transaction into the blockchain, the transaction including the result as part of an updated state to a state already recorded in the blockchain.

In Example 50, the subject matter of Example 49, wherein the state already recorded in the blockchain was entered by an orchestrator servicing the request.

In Example 51, the subject matter of Example 50, wherein the already entered state includes an intended action for the FaaS node.

Example 52 is a system for secure edge-cloud function as a service (FaaS), the system comprising: means for receiving, by a FaaS node, a request to execute a function; means for executing the function; and means for entering a result of the function execution into a blockchain, the blockchain being accessible to a plurality of FaaS architectural nodes.

In Example 53, the subject matter of Example 52, comprising means for transmitting the result of the function to a target.

In Example 54, the subject matter of Example 53, wherein the target provided the request.

In Example 55, the subject matter of any of Examples 53-54, wherein the target is specified in the request.

In Example 56, the subject matter of any of Examples 52-55, wherein the FaaS node is at least one of an edge node or a cloud node.

In Example 57, the subject matter of any of Examples 52-56, wherein the means for entering the result of the function include: means for storing metrics of function execution in a secure facility of the FaaS node; and means for providing the metrics of function execution from the secure facility to the blockchain in the form of a transaction.

In Example 58, the subject matter of any of Examples 52-57, comprising: means for receiving a user request to perform a task at a FaaS orchestrator; means for organizing, by the FaaS orchestrator, a plurality of FaaS nodes to perform the task, the plurality of FaaS nodes including the FaaS node; and means for transmitting requests to the plurality of FaaS nodes to complete portions of the task, the requests including the request to the FaaS node.

In Example 59, the subject matter of Example 58, wherein the means for organizing the plurality of FaaS nodes to perform the task include means for transmitting the task to a function decomposition engine (FDE) to split the task into subtasks that correlate with available FaaS node capabilities.

In Example 60, the subject matter of Example 59, wherein the FDE is at least one of an edge FDE (EFDE) or cloud FDE (CFDE).

In Example 61, the subject matter of any of Examples 59-60, wherein the result of the function is transmitted to the FDE.

In Example 62, the subject matter of any of Examples 58-61, wherein the plurality of FaaS nodes use the blockchain to coordinate completion of portions of the task.

In Example 63, the subject matter of any of Examples 52-62, wherein the means for executing the function include means for executing the function in a container on the FaaS node.

In Example 64, the subject matter of Example 63, wherein the container employs memory encryption for the function execution.

In Example 65, the subject matter of any of Examples 63-64, wherein the container synchronizes state among different FaaS nodes operating on a user request that resulted in the request.

In Example 66, the subject matter of any of Examples 52-65, wherein the means for entering the result of the function execution into the blockchain include means for entering a transaction into the blockchain, the transaction including the result as part of an updated state to a state already recorded in the blockchain.

In Example 67, the subject matter of Example 66, wherein the state already recorded in the blockchain was entered by an orchestrator servicing the request.

In Example 68, the subject matter of Example 67, wherein the already entered state includes an intended action for the FaaS node.

Example 69 is at least one machine-readable medium including instructions that, when executed by processing circuitry, cause the processing circuitry to perform operations to implement of any of Examples 1-68.

Example 70 is an apparatus comprising means to implement of any of Examples 1-68.

Example 71 is a system to implement of any of Examples 1-68.

Example 72 is a method to implement of any of Examples 1-68.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A system for secure edge-cloud function as a service (FaaS), the system comprising:
    a FaaS node that includes:
        a memory including instructions; and
        processing circuitry that, when in operation, is configured by the instructions to:
            receive a request to execute a function;
            execute the function; and
            enter a result of the function execution into a blockchain, the blockchain being accessible to a plurality of FaaS architectural nodes; and
    a FaaS orchestrator that includes:
        a second memory including second instructions; and
        second processing circuitry that, when in operation, is configured by the second instructions to:
            receive a user request to perform a task;
            organize a plurality of FaaS nodes to perform the task, the plurality of FaaS nodes including the FaaS node, wherein, to organize the plurality of FaaS nodes to perform the task, the second instructions configure the second processing circuitry to transmit the task to both an edge function decomposition engine (EFDE) and a cloud FDE (CFDE) to split the task into subtasks that respectively correlate with available edge and cloud FaaS node capabilities; and
            transmit requests to the plurality of FaaS nodes to complete portions of the task, the requests including the request to the FaaS node.

2. The system of claim 1, wherein, to enter the result of the function, the processing circuitry is arranged by the instructions to:
    store metrics of function execution in a secure facility of the FaaS node; and
    provide the metrics of function execution from the secure facility to the blockchain in the form of a transaction.

3. The system of claim 1, wherein the plurality of FaaS nodes use the blockchain to coordinate completion of portions of the task.

4. The system of claim 1, wherein, to enter the result of the function execution into the blockchain, the instructions configure the processing circuitry to enter a transaction into the blockchain, the transaction including the result as part of an updated state to a state already recorded in the blockchain.

5. The system of claim 4, wherein the state already recorded in the blockchain was entered by the FaaS orchestrator servicing the request.

6. The system of claim 1, wherein, to execute the function, the instructions configure the processing circuitry to execute the function in a container on the FaaS node.

7. The system of claim 6, wherein the container employs memory encryption for the function execution.

8. The system of claim 6, wherein the container synchronizes state among different FaaS nodes operating on a user request that resulted in the request.

9. A method for secure edge-cloud function as a service (FaaS), the method comprising:
    receiving, by a FaaS node, a request to execute a function;
    executing the function;
    entering a result of the function execution into a blockchain, the blockchain being accessible to a plurality of FaaS architectural nodes;
    receiving a user request to perform a task at a FaaS orchestrator;

organizing, by the FaaS orchestrator, a plurality of FaaS nodes to perform the task, the plurality of FaaS nodes including the FaaS node, wherein organizing the plurality of FaaS nodes to perform the task to both an edge function decomposition engine (EFDE) and a cloud FDE (CFDE) to split the task into subtasks that respectively correlate with available edge and cloud FaaS node capabilities; and transmitting requests to the plurality of FaaS nodes to complete portions of the task, the requests including the request to the FaaS node.

10. The method of claim 9, wherein entering the result of the function includes:
storing metrics of function execution in a secure facility of the FaaS node; and
providing the metrics of function execution from the secure facility to the blockchain in the form of a transaction.

11. The method of claim 9, wherein the plurality of FaaS nodes use the blockchain to coordinate completion of portions of the task.

12. The method of claim 9, wherein entering the result of the function execution into the blockchain includes entering a transaction into the blockchain, the transaction including the result as part of an updated state to a state already recorded in the blockchain.

13. The method of claim 12, wherein the state already recorded in the blockchain was entered by the FaaS orchestrator servicing the request.

14. The method of claim 9, wherein executing the function includes executing the function in a container on the FaaS node.

15. The method of claim 14, wherein the container employs memory encryption for the function execution.

16. The method of claim 14, wherein the container synchronizes state among different FaaS nodes operating on a user request that resulted in the request.

17. At least one non-transitory machine readable medium including:
first instructions for secure edge-cloud function as a service (FaaS), the instructions, when execute by processing circuitry of a FaaS node, cause the processing circuitry to perform operations comprising:
receiving a request to execute a function;
executing the function; and
entering a result of the function execution into a blockchain, the blockchain being accessible to a plurality of FaaS architectural nodes; and second instructions that, when execute by second circuitry a FaaS orchestrator, cause the second circuitry to perform second operations comprising:
receiving a user request to perform a task;
organizing a plurality of FaaS nodes to perform the task, the plurality of FaaS nodes including the FaaS node, wherein organizing, by the FaaS orchestrator, a plurality of FaaS nodes to perform the task, the plurality of FaaS nodes including the FaaS node, wherein organizing the plurality of FaaS nodes to perform the task to both an edge function decomposition engine (EFDE) and a cloud FDE (CFDE) to split the task into subtasks that respectively correlate with available edge and cloud FaaS node capabilities; and
transmitting requests to the plurality of FaaS nodes to complete portions of the task, the requests including the request to the FaaS node.

18. The at least one machine readable medium of claim 17, wherein entering the result of the function includes:
storing metrics of function execution in a secure facility of the FaaS node; and
providing the metrics of function execution from the secure facility to the blockchain in the form of a transaction.

19. The at least one machine readable medium of claim 17, wherein the plurality of FaaS nodes use the blockchain to coordinate completion of portions of the task.

20. The at least one machine readable medium of claim 17, wherein entering the result of the function execution into the blockchain includes entering a transaction into the blockchain, the transaction including the result as part of an updated state to a state already recorded in the blockchain.

21. The at least one machine readable medium of claim 20, wherein the state already recorded in the blockchain was entered by the FaaS orchestrator servicing the request.

22. The at least one machine readable medium of claim 17, wherein executing the function includes executing the function in a container on the FaaS node.

23. The at least one machine readable medium of claim 22, wherein the container employs memory encryption for the function execution.

24. The at least one machine readable medium of claim 22, wherein the container synchronizes state among different FaaS nodes operating on a user request that resulted in the request.

* * * * *